United States Patent [19]

Jaquette

[11] Patent Number: 5,388,085

[45] Date of Patent: * Feb. 7, 1995

[54] APPARATUS AND METHOD FOR ACCESSING SECTORS OF A ROTATING DISK

[75] Inventor: Glen A. Jaquette, Tucson, Ariz.

[73] Assignee: International Business Machines Corporation, Armonk, N.Y.

[*] Notice: The portion of the term of this patent subsequent to May 24, 2011 has been disclaimed.

[21] Appl. No.: 25,465

[22] Filed: Mar. 3, 1993

[51] Int. Cl.⁶ .................................................. G11B 17/22
[52] U.S. Cl. ......................................... 369/32; 369/48; 369/54; 369/124; 360/50; 360/51; 360/53; 360/48
[58] Field of Search ................. 369/48, 47, 32, 50, 369/54, 58, 124; 360/50, 51, 53, 48, 72.2, 78.14

[56] References Cited

U.S. PATENT DOCUMENTS

| | | | |
|---|---|---|---|
| 4,740,938 | 4/1988 | Bierhoff et al. | 360/78.14 X |
| 4,833,663 | 5/1989 | Satoh et al. | 369/32 |
| 4,847,705 | 7/1989 | Weng et al. | 360/49 |
| 4,894,734 | 1/1990 | Fischler et al. | 360/51 |
| 4,901,300 | 2/1990 | Van Der Zande et al. | 369/47 |
| 4,998,231 | 3/1991 | Watanabe et al. | 369/13 |
| 4,999,720 | 3/1991 | Wilson et al. | 360/48 |
| 4,999,824 | 3/1991 | Fuji et al. | 369/13 |
| 5,050,013 | 9/1991 | Holsinger | 360/72.1 |
| 5,062,091 | 10/1991 | Maeda et al. | 369/13 |
| 5,067,120 | 11/1991 | Yamauchi | 369/59 |
| 5,068,755 | 11/1991 | Hamilton et al. | 360/72.1 |
| 5,070,492 | 12/1991 | Ogawa et al. | 369/47 |
| 5,091,897 | 2/1992 | Otokawa et al. | 369/13 |
| 5,093,820 | 3/1992 | Maeda et al. | 369/50 |
| 5,148,422 | 9/1992 | Sako et al. | 369/44.26 |
| 5,210,733 | 5/1993 | Yamaguchi et al. | 369/48 |
| 5,257,143 | 10/1993 | Zangenehpour | 360/48 |
| 5,257,248 | 10/1993 | Ogasawara | 369/32 |
| 5,315,568 | 5/1994 | Dente et al. | 369/32 |

*Primary Examiner*—Robert J. Pascal
*Assistant Examiner*—Arnold Kinkead
*Attorney, Agent, or Firm*—D. A. Shifrin

[57] ABSTRACT

Apparatus and method are provided to increase the capacity of spiral track data storage disks while improving the reliability of access to sectors on the disk by permitting previously unusable sectors immediately following a band boundary to be reliably accessed. In accordance with the present invention, an optical drive controller is provided having a clock for generating a clock signal with a frequency of $f_N$ and a cycle slipper for generating a slipped clock signal with a frequency of $f_{N-1}$ from the clock signal. The controller also includes a device for enabling the slipper when an optical head is positioned opposite a sector in a band N-1 during a seek operation to a target sector in band N, and for disabling the slipper when the optical head is positioned opposite the end of the last sector in band N-1. Thus, identification information pertaining to sectors in band N-1 is processed at a data transfer rate of $f_{N-1}$ and the data transfer rate is switched to $f_N$ with only an insignificant delay, permitting the first several sectors in band N to be used. Embodiments of the present invention include the use of full-cycle slipping and half-cycle slipping.

25 Claims, 7 Drawing Sheets

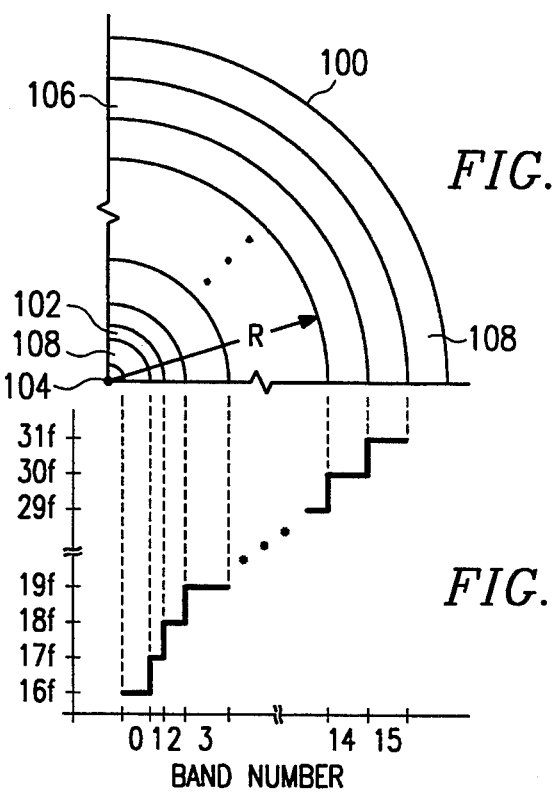
FIG. 3A
FIG. 3B
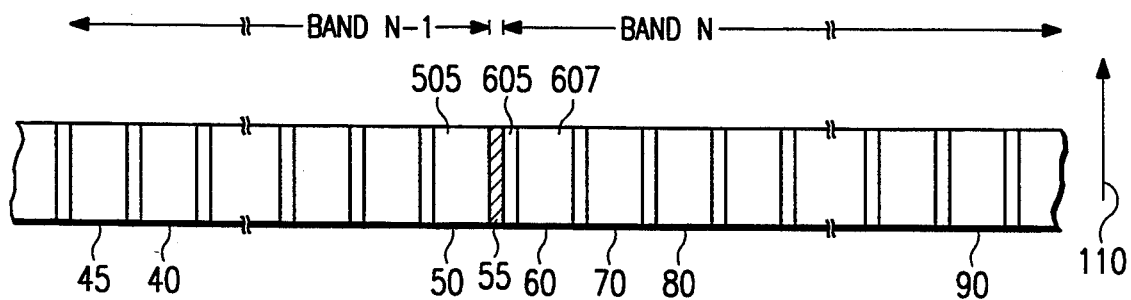
FIG. 4A
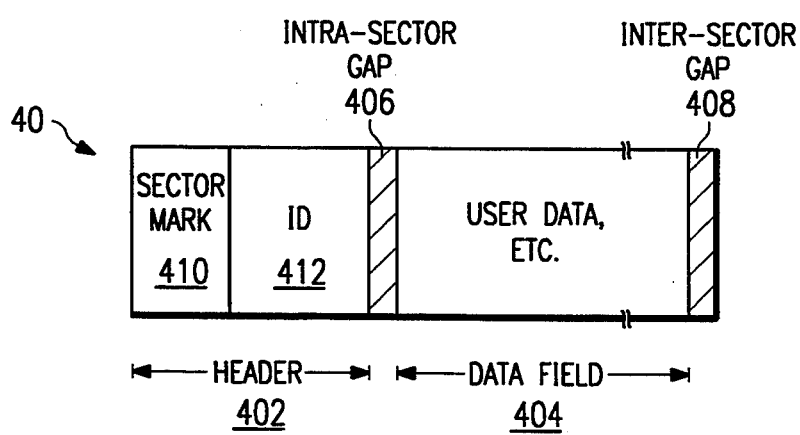
FIG. 4B

APPARATUS AND METHOD FOR ACCESSING SECTORS OF A ROTATING DISK

RELATED APPLICATION

This application is related to co-pending and commonly assigned U.S. patent application Ser. No. 07/974,639, filed Nov. 11, 1992, now U.S. Pat. No. 5,315,568.

TECHNICAL FIELD OF THE INVENTION

The present invention relates to accessing sectors on rotating storage media, and in particular, to increasing the capacity of spiral track data storage disks, such as optical disks, while improving the reliability of access to sectors on the disk.

BACKGROUND OF THE INVENTION

A rotating recording disk, such as an optical disk, can be formatted in concentric physical tracks (each corresponding to a single disk revolution) or in a single spiral around a central spindle hole/mounting hub. The spiral is divided into a series of logical tracks (not necessarily corresponding to a single revolution); each logical track (hereinafter referred to simply as a "track") is subdivided into sectors onto which blocks of data are recorded. Each sector has a header field followed by a data field, with an intra-sector gap between the two. An inter-sector gap separates the sector from a following sector. The header is generally embossed into the surface of the disk during the manufacturing process (although the disk can be soft formatted instead) and includes a sector mark, a series of identification (ID) fields with track and sector information, and other fields to aid a read/write controller in synchronizing to the sector. The data field includes user data, associated error detection and recovery information, and synchronization information. Under one proposed standard for read only, write once and rewritable optical disk cartridges (in which an optical disk is encased in a protective housing), the header is 52 bytes long (including a five-byte, five feature sector mark pattern) and the data field is 1274 or 665 bytes long (based on 17 or 31 sectors per track, respectively, and able to record user data of 1024 or 512 bytes, respectively).

During a read or write operation, a laser beam emitted from a read/write head must be directed onto the sector to be accessed. As is known, the head is moved radially inward or outward on a carriage under servo control for the laser beam to "land" on a sector near, but ahead of, the target sector. "Near" is between about five tracks before and three sectors before the target sector. The drive controller switches to a track following mode and, using asynchronous detection, attempts to detect the first sector mark encountered by detecting laser light reflected off of a surface of the disk. A sector mark is considered detectable if at least three of the five features in the sector mark pattern are recognized. The light reflections are converted into electrical signals representative of the data recorded on the disk. If at least three features cannot be satisfactorily detected, synchronization with the disk format is not achieved and the head scans for another sector mark. Once a sector mark is satisfactorily detected, the drive controller activates a phase locked loop to lock onto the incoming identification data stream of the rest of the header and to synchronize the drive controller to the data stream. Current disk formats employ a pulse position modulation (PPM) format although other formats have been proposed. The ID data is decoded into track and sector information, enabling the drive controller to determine the exact position on the disk of the laser beam.

If the sector on which the laser beam lands is not the target sector, a conventional controller reads subsequent sector marks and headers as the laser beam spirals toward the target sector. After detection of a first sector mark and ID, detection of subsequent ID's is commonly made more robust by disabling sector mark detection except during a small timing window (such as about ±0.5%) about the nominal location of subsequent sector marks to prevent false sector mark detection. Another commonly used technique forces a false (or "pseudo") sector mark detection event at the end of the timing window if no sector mark has been detected within the window. Such a technique allows the reading of an ID which has a defective or destroyed sector mark. By thus windowing in time from one sector mark to the next, a more robust ID reading system is obtained in which false sector marks are ignored and bad sector marks do not inhibit reading of the ID. In this manner, the controller counts down ID's until the target sector is reached. When the target sector is reached and properly identified, the user data is read from, erased from or written to the data field.

When the disk spins at a constant angular velocity (CAV), data recording and reading is highly stable and access time to a target sector is relatively fast. However, if a constant recording data rate is used, data recorded on tracks near the outer diameter of the disk will be at a lower linear density than data recorded near the inner diameter, although the amount of data recorded in a given angular rotation (angular recording density) will be the same. To increase the recording capacity of the disk, the linear density of the data should remain substantially constant by increasing the angular recording density as the radial distance from the spindle hole increases. Recording at a constant linear velocity (CLV) by decreasing the angular velocity (rotational speed) of the disk with increasing radial distance and maintaining a constant recording or data transfer rate can achieve increased angular recording density. But, random access time to a target sector is increased due to the time required to change the rotational speed of the disk.

A method which provides the advantages of both CAV and CLV, while reducing the disadvantages of each, is to record at a modified constant angular velocity (MCAV) by increasing the data transfer rate of the drive controller with increasing radial distance while holding the angular velocity constant. The transfer rate is a function of the frequency of the controller's clock and can be increased continually or can be increased incrementally by grouping tracks into bands and incrementing the clock frequency from band to band.

As an example of banded media, optical disks formatted according to the previously mentioned standard have 37,600 tracks in a user zone (located between inner and outer manufacturer and control zones near the inner and outer diameters of the disk) divided into sixteen annular bands of between 1600 and 3100 tracks each, the number of tracks per band increasing with increasing radial distance from the center spindle hole. Relative to a base frequency "f", the clock frequency is "16f" at band zero (the innermost band), while at band fifteen (the outermost band), the clock frequency is "31f". Thus, the angular recording density will increase band by band with increasing radial distance but the linear density at the inner diameter of each band is constant.

Spiral, banded recording is generally preferred for high performance optical applications. If during a seek operation the laser beam lands in the same band in which the target sector is located, sector marks, ID information and user data can be detected and read without a clock frequency change. However, if the laser beam lands in one band (band N-1) and the target sector is in the next band (band N), the clock frequency must be set to $f_{N-1}$ for proper sector mark detection and to read the ID's in band N-1 and then changed to frequency $f_N$ at the boundary between bands N-1 and N for proper sector mark detection and to read the ID's and user data in band N. Because of code overhead, clock settling time and other delays, which can be approximately 50 microseconds, a certain delay is incurred after the clock frequency has changed. This clock switching delay prevents the use of windowing to the next sector mark and reduces the robustness afforded by the windowing technique. For example, if the first sector of the new band has a bad sector mark, it may be unrecoverable with no means to synchronize the controller to read the ID. Moreover, a sector near the inner diameter of a 512 byte/sector disk may pass in about 500 microseconds while a sector near the outer diameter may pass in only about 300 microseconds. Consequently, if the target is the first sector of band N and the clock frequency changes after detection of the last sector mark of the last track of band N-1, target sector detection will be unreliable and may, in fact, be impossible. On the other hand, if the frequency is changed from $f_{N-1}$ to $f_N$ while the head is still in band N-1, the remaining sector marks and ID information in band N-1 cannot be reliably read and windowing of sector marks cannot be used because controller synchronization can be lost. Other combinations of target sector locations and locations of sectors on which the laser beam lands relative to band boundaries also result in reduced reliability with which sector marks can be detected and data written or read. Consequently, it has been preferred to remap, or otherwise designate as unusable or spare, certain sectors or even tracks at or near band boundaries thereby wasting valuable disk capacity and increasing access time.

SUMMARY OF THE INVENTION

In view of the foregoing, it is an object of the present invention to increase the capacity of spiral recording disks.

It is another object to improve the reliability and speed of access to data on such a disk.

It is still another object to reduce performance deficiencies associated with writing data to or reading or erasing data from a sector located at or near the beginning of a band of a storage disk.

These and other objects are achieved in the present invention by providing an optical drive controller having a clock for generating a clock signal with a frequency of $f_N$ and a circuit for generating a synthesized signal with a frequency of $f_{N-1}$ from the clock signal. The controller also includes a device for enabling the synthesizer when an optical head is positioned at the end of a sector in a band N-1 during a seek operation to a target sector in band N, and for disabling the synthesizer when the optical head is positioned opposite the end of the last sector in band N-1. Thus, identification information pertaining to sectors in band N-1 is processed at a data transfer rate of $f_{N-1}$ and the data transfer rate is switched to $f_N$ with only an insignificant delay, permitting data to be written to and read from the first several sectors in band N. In particular, the present invention permits windowed sector mark detection on each sector up to and across a band boundary, thereby achieving a very robust system even if media defects obscure header or sector marks.

In one embodiment of the present invention, full-cycle slipping is employed whereby one clock cycle of each N clock cycles is suppressed. When the frequency of the clock signal is $f_N$, the average frequency of the resulting synthesized signal is $f_{N-1}$. In another embodiment, half-cycle slipping is employed whereby two half-cycles of each N clock cycles are suppressed; the average frequency of the resulting synthesized signal is again $f_{N-1}$.

The foregoing and other features and advantages of the invention will be apparent from the following more particular description of preferred embodiments of the invention, as illustrated in the accompanying drawings.

BRIEF DESCRIPTION OF THE DRAWINGS

FIG. 3A illustrates a portion of an optical disk in which logical tracks are grouped into a plurality of annular bands;

FIG. 3B is a plot illustrating the association of clock frequencies with corresponding bands of the optical disk of FIG. 3A;

FIG. 4A illustrates the format of portions of two contiguous bands of the optical disk of FIG. 3A;

FIG. 4 illustrates the format of one sector from one band of FIG. 4A;

DETAILED DESCRIPTION OF THE INVENTION

Figure 1:
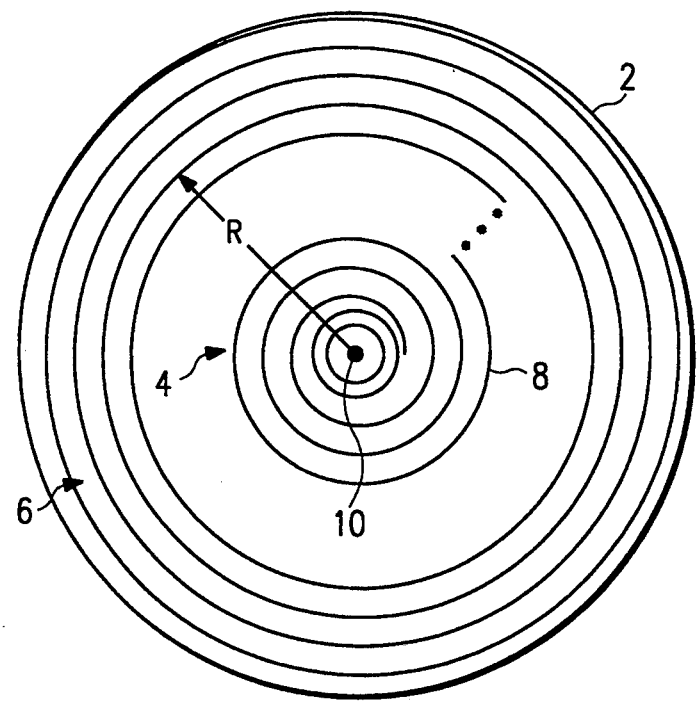
FIG. 1 illustrates an optical disk having a spiral formatted track.

FIG. 1 illustrates an optical recording disk 2 having spiral track formatting. Inner and outer portions 4 and 6 of a spiral track 8 (exaggerated) are shown around a central spindle hole/mounting hub 10. The spiral 8 is divided into a series of logical tracks, each being subdivided into sectors onto which blocks of data are recorded. As illustrated in FIG. 4B, each sector, such as a sector 40, has a header field 402 followed by a data field 404, with an intra-sector gap 406 between the two. An inter-sector gap 408 separates the sector 40 from a following sector. The header 402 includes a sector mark 410, a series of ID fields 412 with track and sector information, and other fields (not shown) to aid a controller in synchronizing to the sector 40. The data field 404 includes user data, associated error detection and recovery information, and synchronization information.

Figure 2:
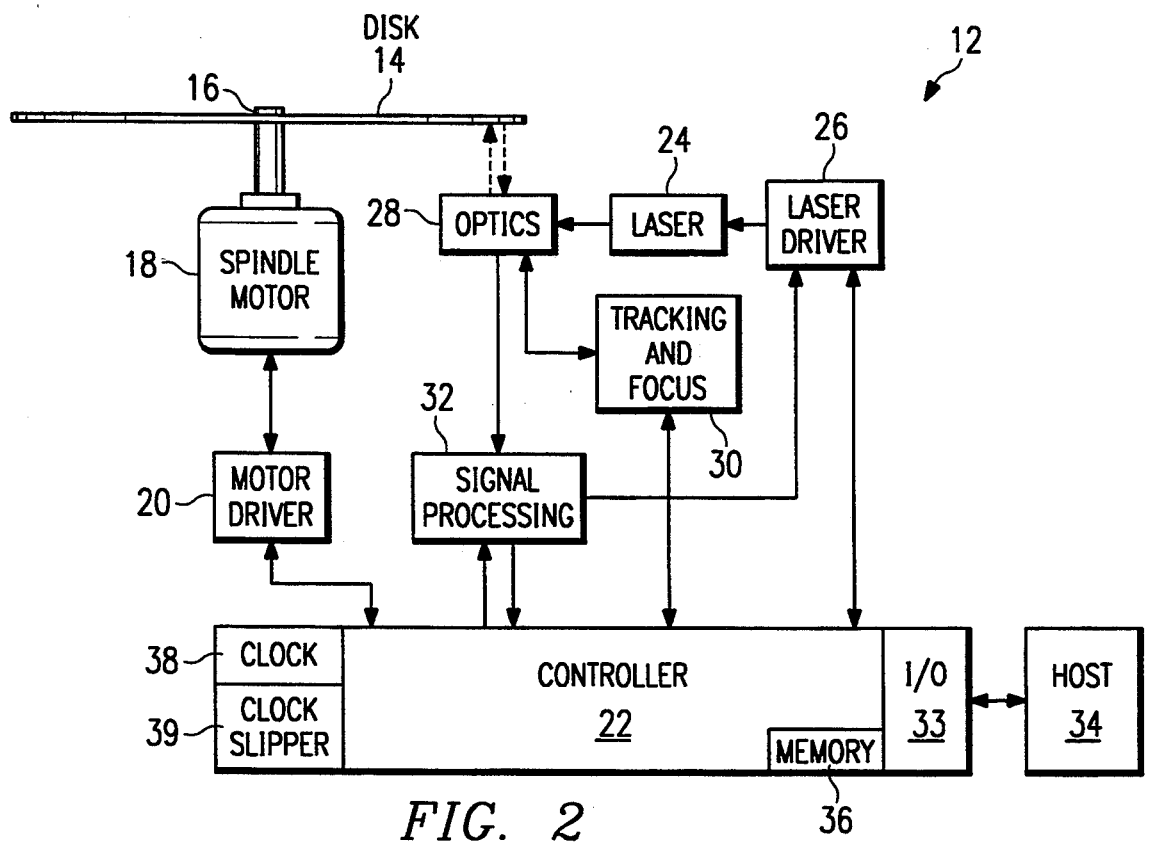
FIG. 2 is a block diagram of an optical disk subsystem of the present invention.

FIG. 2 is a block diagram of an optical drive subsystem 12 of the present invention in which an optical disk 14 is mounted on a spindle 16 connected to a motor 18. The disk 14 can be permanently mounted to the spindle 16 or can be removable; it can also be encased in a protective housing in the form of a removable cartridge. Moreover, the disk 14 can be read only (in which all of the information contained thereon has been pre-embossed), write once (in which track and sector formatting is pre-embossed and user data permanently "burned" into the disk surface as a series of pits) or erasable/re-writable (in which track and sector formatting is pre-embossed and user data recorded employing known erasable processes such as magneto-optical or phase change). The present invention is not limited to use with pre-embossed disks but is equally applicable to soft formatted disks. Additionally, the subsystem 12 can be a stand-alone subsystem or can be part of a storage library containing several such subsystems, a number of storage cells and a mechanical picker to manage a large number of disks.

The motor 18 is driven by a motor driver 20 which is controlled by a controller 22, such as a microprocessor. A laser beam, generated by a laser 24 driven by a laser driver 26, is projected onto a surface of the disk 14 through an optic subsystem 28 of movable prisms and lenses. The positioning of the optical elements in the subsystem 28 are controlled by various seeking, tracking and focusing servos and feedback loops 30 which are, in turn, controlled by the controller 22. When the subsystem 12 is accessing a sector or reading user data from the disk 14, laser light reflected off of the disk surface is converted into electrical signals, processed by a signal processor 32 and sent to the controller 22. The user data signals are subsequently transmitted through an interface 33 to a host processor 34. When the subsystem 12 is writing user data to the disk 14, signals from the signal processor 32 cause laser driver 26 to modulate the laser 24 to record data onto the disk surface in a known manner. One or more memory devices 36 contain instructions and tables for the controller 22. Signals are transferred to and from the disk 14 and processed by the controller 22 at a rate established by a variable frequency clock 38 and a synthesizer (also referred to as a "clock slipper") 39. It will be appreciated that the variable frequency clock 38 can include a conventional frequency synthesizer having a phase locked loop referenced to a crystal. The clock slipper 39 of the present invention employs a different design to synthesize frequencies from the clock 38, as will be detailed below.

FIG. 3A illustrates a portion of an exemplary banded disk 100 with which the present invention can be used. The disk 100 has sixteen bands of between 1600 and 3100 logical tracks each. (These numbers are for illustrative purposes; the present invention is not restricted to any particular number of bands, tracks or sectors. Additionally, to simplify the figure, logical tracks are not shown.) The band 102 closest to the spindle hole 104 is referred to as band zero while the band 106 farthest from the spindle hole 104 is referred to as band fifteen. Non-user inner and outer manufacturer and control zones 108 exist near the inner and outer diameters of the disk 100 but are not pertinent to the present invention. An arrow R represents the radial distance of a band from the spindle hole 104.

Under a modified constant angular velocity (MCAV) recording system, the data transfer rate of the controller 22 is governed by the variable frequency clock 38 and increases with increasing radial band distance R. FIG. 3B is a plot of the frequency versus the band number of the disk 100 and illustrates the step-wise progression of the frequency. Preferably, each frequency is a function of a base frequency f. A conversion or lookup table in ROM, as part of the memory 36, can store band information correlated with appropriate frequencies. It can be appreciated that frequency control must be as rigid as possible for satisfactory data transfer and that a delay interval following a change in the frequency of the clock, due to code overhead, hardware settling and other factors must be taken into account or avoided.

FIG. 4A illustrates the format of portions of two contiguous bands N-1 and N of the optical disk 100 of FIG. 3A and FIG. 4B illustrates the format of one sector 40 of band N-1. Scanning occurs from left to right in FIGS. 4A and 4B and the radially outward direction is indicated in FIG. 4A by an arrow 110. Band and sector formats have been simplified for purposes of illustration. Data read from or written to sectors in band N are processed by the controller 22 at a frequency $f_N$; data read from or written to sectors in band N-1 (the band immediately preceding band N) are processed by the controller 22 at a frequency $f_{N-1}$.

Figure 5:
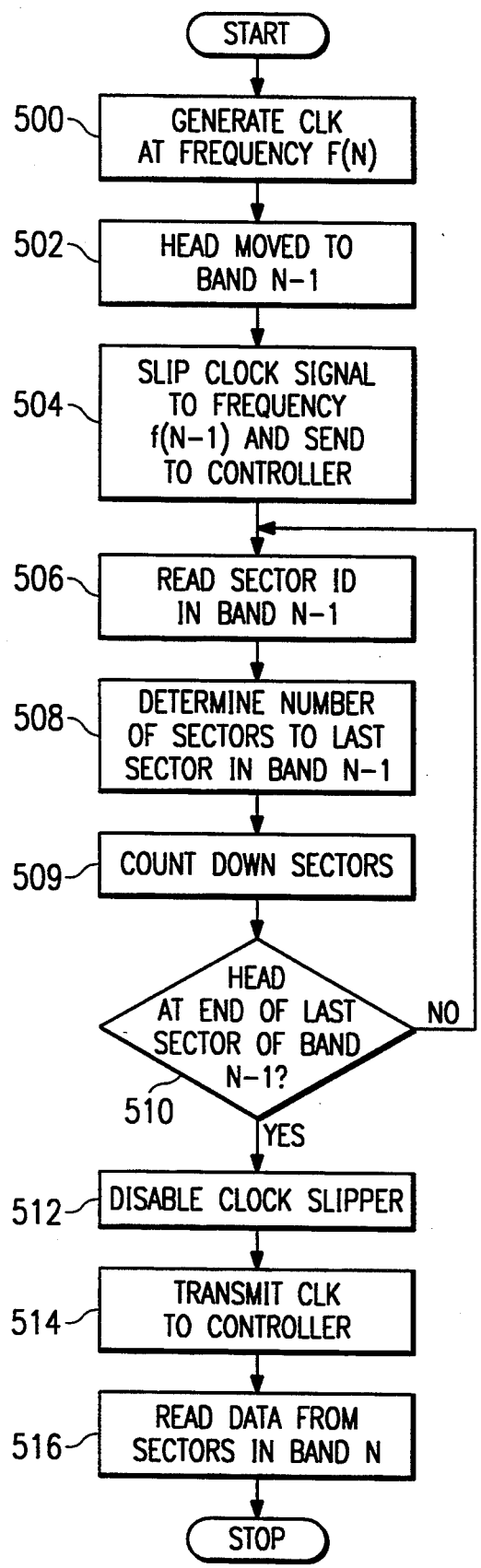
FIG. 5 is a flow chart of the process of the present invention.

The operation of the present invention will now be described with reference to FIGS. 4A, 4B and 5. When a target sector to be accessed (to be read from, written to or erased) is one of the first several sectors in band N, such as the first sector 60, the clock 38 is set to the frequency $f_N$, the data transfer rate of band N (Step 500), outputs a signal CLK and the head is moved radially (Step 502) to band N-1. The laser beam will first land on a sector, such as sector 45, in band N-1, generally no closer to the target sector 60 than three sectors and no farther away than five tracks. It will be appreciated that the seek window can have endpoints other than those suggested here. The clock slipper 39 is then enabled, receives the signal CLK from the clock 38 and a synthesized or slipped clock signal is generated with an average frequency of $f_{N-1}$ and used to set the data transfer rate of the controller 22 (Step 504). Sector mark detection is set to scan and permit the subsystem 12 to detect the sector mark 410 of the next sector 40 and lock onto and read ID information in the ID field 412, thereby identifying the current location of the laser beam (Step 506). After the controller has locked onto a valid sector ID, sector mark windowing is enabled to make the processing and counting of subsequent ID's more robust.

When the controller 22 identifies a sector in band N-1, it calculates the number of sectors between the present location of the head 28 and the band boundary 55 (Step 508) and sets a control counter within the clock slipper 39. The controller further counts the number of sectors as they pass by the head (Step 509) until the band boundary is reached (Step 510). The controller 22 provides a signal related to the sector mark windowing circuit which provides a transition at the end of each sector. The control circuit within the clock slipper 600 can thus count down (or up) the sectors as they pass, even if each sector ID after the first ID read is obscured by defects. This technique is made more robust by having the controller 22 attempt to read each ID as it passes to validate the sector distance to the band boundary and verify that the control counter remains in step with the proper sector difference. At the end (indicated by a transition on the aforementioned signal from the controller 22) of the last sector in band N-1, the control counter forces a control line to be toggled to disable clock slipping (Step 512) and the pure signal CLK from the clock 38 is transmitted to the controller (Step 514). The controller is thus continuously synchronized with the disk format, which is required for windowing of sector marks and robust ID handling, despite the possible presence of defective ID's or sector marks in the first sectors of band N. Moreover, the change in the data transfer rate occurs with only an insignificant delay. All sectors in band N, including the first several sectors after the boundary between band N-1 and N, can be read (Step 516) at the proper frequency and the target sector 60 accessed.

Figure 6:
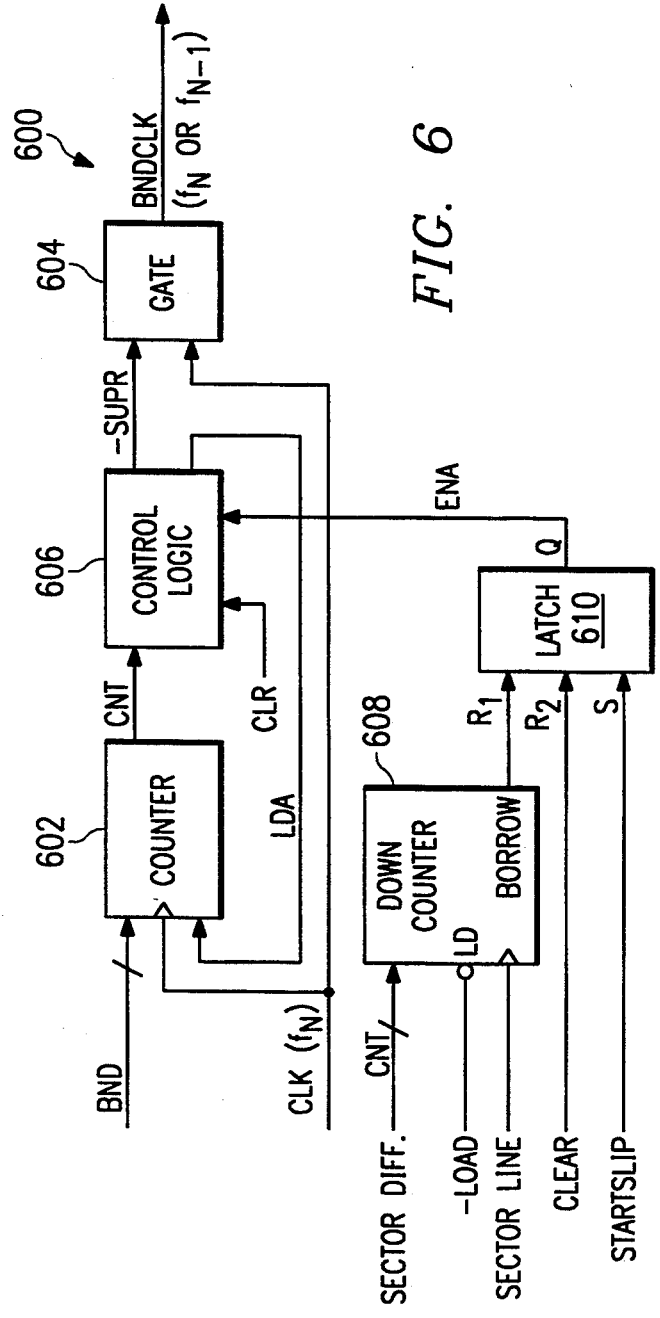
FIG. 6 is a block diagram of one embodiment of the present invention.

FIG. 6 is a block diagram of one embodiment of a clock slipper of the present invention, indicated generally by reference numeral 600. The slipper 600 includes a counter 602, a gate 604, such as an AND gate, and control logic 606. An input of the counter 602 is coupled to receive the signal CLK from the clock 38 having a frequency of $f_N$; an output CNT of the counter 602 is interconnected with an input of the control logic 606. The counter 602 has an input to permit a predetermined number BND to be loaded into the counter 602 from the controller 22. The counter 602 can be a count-up or a count-down counter. If a count-up counter, the signal CNT will indicate when the counter 602 has counted up to the number BND from a reset state, representing the passage of BND cycles of the clock signal CLK. If a count-down counter, the number BND will be loaded into the counter 602 and the signal CNT will indicate when the counter 602 has counted down to zero, again representing the passage of BND cycles of the clock signal CLK.

An output LDA of the control logic 606 is interconnected with another input of the counter 602 to activate the load process of the counter 602. The control logic 606 also has clear and enable inputs CLR and ENA, respectively. An input of the gate 604 is coupled to receive the signal CLK; a second input of the gate 604 is interconnected with a second output of the control logic 606. An output BNDCLK of the gate 604 carries either the pure clock signal CLK at the frequency $f_N$ or the synthesized (slipped) clock signal at the average frequency $f_{N-1}$, as determined by the presence of -SUPR pulses from the control logic 606, to other sections of the controller 22 to process signals from the optical head 28. Slipper 600 also incorporates control counter 608 which is loaded with the distance, in sectors, to the end of the band and which, by counting transitions on a sector line from the controller 22, counts down the sectors as they pass. At the end of the last sector of band N-1, a transition on the sector line causes the counter 608 to carry out (or to borrow, if a down counter is used). This event is latched by a latch 610 which causes the ENA line to transition, in turn causing the control circuit 606 to discontinue sending -SUPR pulses. The gate 604 then transmits CLK signal at frequency $f_N$, unaltered. The latch 610 also has lines STARTSLIP and CLEAR which enable the controller 22 to determined the state of the latch 610 independent of the counter 608.

Figure 7:
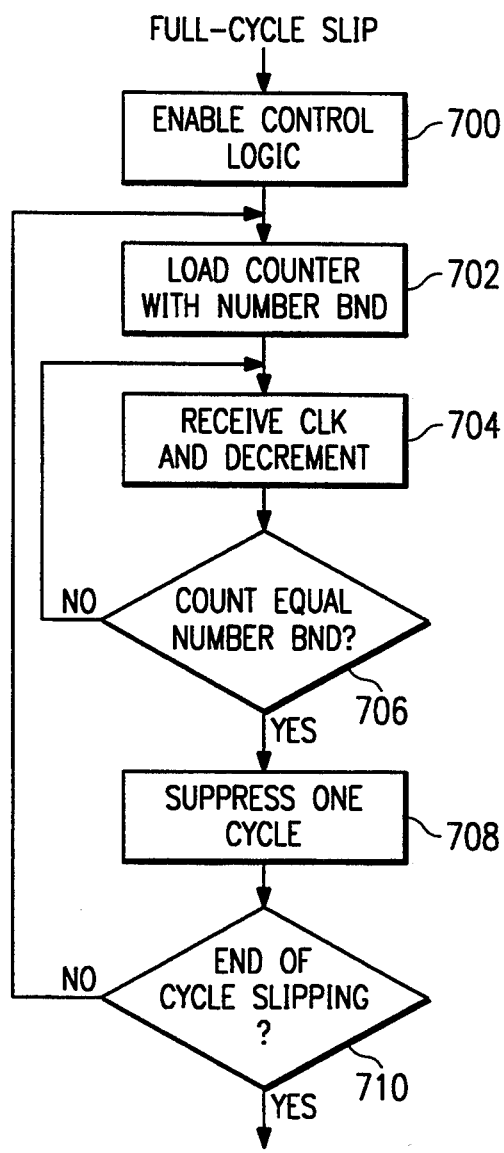
FIG. 7 is a flow chart of the operation of the embodiment illustrated in FIG. 6.

Referring to the flowchart of FIG. 7, a method employed by the embodiment illustrated in FIG. 6 for synthesizing a signal from a clock signal will now be described. When the optical head 28 is positioned such that the laser beam from the head 28 is directed onto a sector in band N-1 and the head 28 begins a track following operation, the control logic 606 is enabled by the controller 22 (Step 700) and directs the counter 602 to load the number BND, which is preferably the band number N-1 (Step 702). The counter begins receiving and counting cycles of the clock signal CLK (Step 704), up or down as previously discussed.

Additionally, the latch 610 is set via a signal on the control STARTSLIP line to enable cycle slipping. Thus enabled by ENA, the control logic 606, through the signal -SUPR, directs the gate 604 to output the clock signal CLK on the line BNDCLK. When the counter 602 has counted N-1 CLK cycles (Step 706), the control logic 606 directs the gate 604 to suppress one cycle of the clock signal CLK (Step 708) and then resume outputting the signal CLK. The resulting output of the gate 604 when the control logic 606 is enabled has an average frequency of $f_{N-1}$, the data transfer rate required to read information from sectors in band N-1. The counter 602 is reloaded while the cycle suppression occurs and the process repeats (Step 710) until the controller 22 has identified the last sector in band N-1 (Step 510, FIG. 5), as previously described. The control logic 606 is then disabled and the gate 604 outputs the pure clock signal CLK, at $f_N$, the data transfer rate required to read information from sectors in band N. Disabling the clock slipper when the end of the last sector in band N-1 has been reached requires only a nominal amount of time; therefore, the controller 22 is ready to read the first sectors in band N without significant delay.

Figure 8:
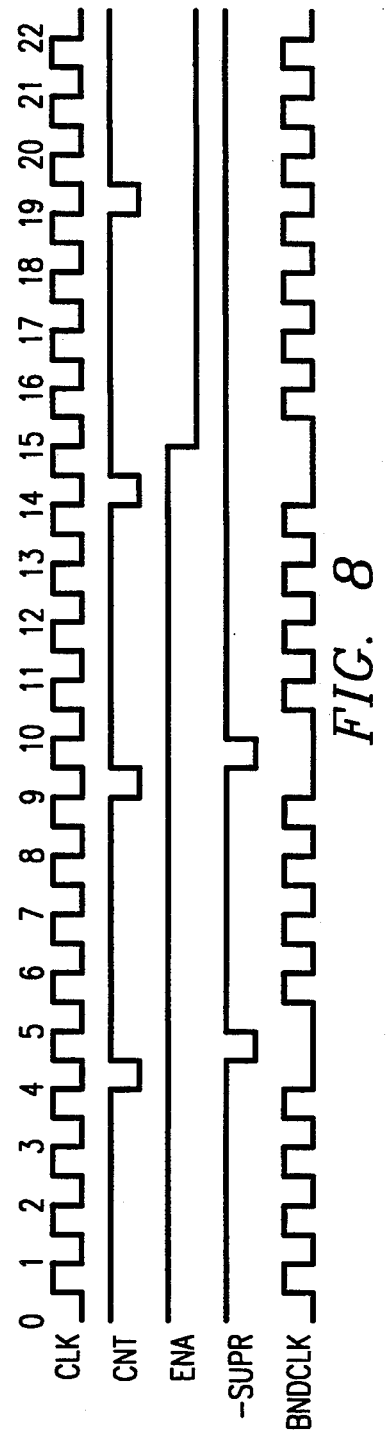
FIG. 8 is a set of exemplary timing diagrams of certain signals from the embodiment illustrated in FIG. 6.

FIG. 8 is a timing diagram of the clock slipping of a CLK signal; the waveforms illustrate exemplary signals generated on various lines of the embodiment of FIG. 6. In this illustration, the target sector is in a band N=5 and the optical head lands in the preceding band N-1=4. As previously noted, the bands are numbered from the innermost band 0 to the outermost band 15 and have corresponding frequencies of 16f to 31f (f representing a base frequency). For clarity, the frequencies shown in the timing diagram are 4f and 5f, rather than 20f and 21f, corresponding to the data transfer rates of bands 4 and 5, respectively. The apparatus and method of the present invention can be used, however, to synthesize any $f_{N-1}$ from any $f_N$.

At time zero in this illustration, the control logic 606 has been enabled by the ENA signal being in a high state and the counter 602 has been loaded with the predetermined number, N=4. (It will be appreciated that logic signals, such as ENA, CNT and -SUPR, may be in a normally low state or in a normally high state, depending upon the logic design configuration selected. The present invention does not depend upon any particular such configuration or signal state.) The counter 602 output CNT and the control logic 606 output -SUPR are both high. Therefore, the gate 604 outputs the pure CLK signal as signal BNDCLK. Following the completion of four of each five CLK cycles, that is, after CLK cycles four, nine, and fourteen, the output CNT goes low for one cycle and causes the state of -SUPR to go low for one cycle. As a result, the gate 604 blocks the passage of one CLK cycle of each five as shown by the BNDCLK waveform of FIG. 8. Over the fifteen CLK cycles during which the control logic 606 is enabled, the average frequency of BNDCLK is 4/5 the frequency of CLK. This technique has been termed "full-cycle slipping".

When the head is positioned opposite the end of the last sector in band 4 (N-1), after the fifteenth CLK cycle illustrated, the control logic 606 is disabled in response to ENA going low and -SUPR remains high. Thus, the BNDCLK signal transmitted by the gate 604 is again the pure CLK signal, without suppression, at the frequency of 5f.

Figure 9:
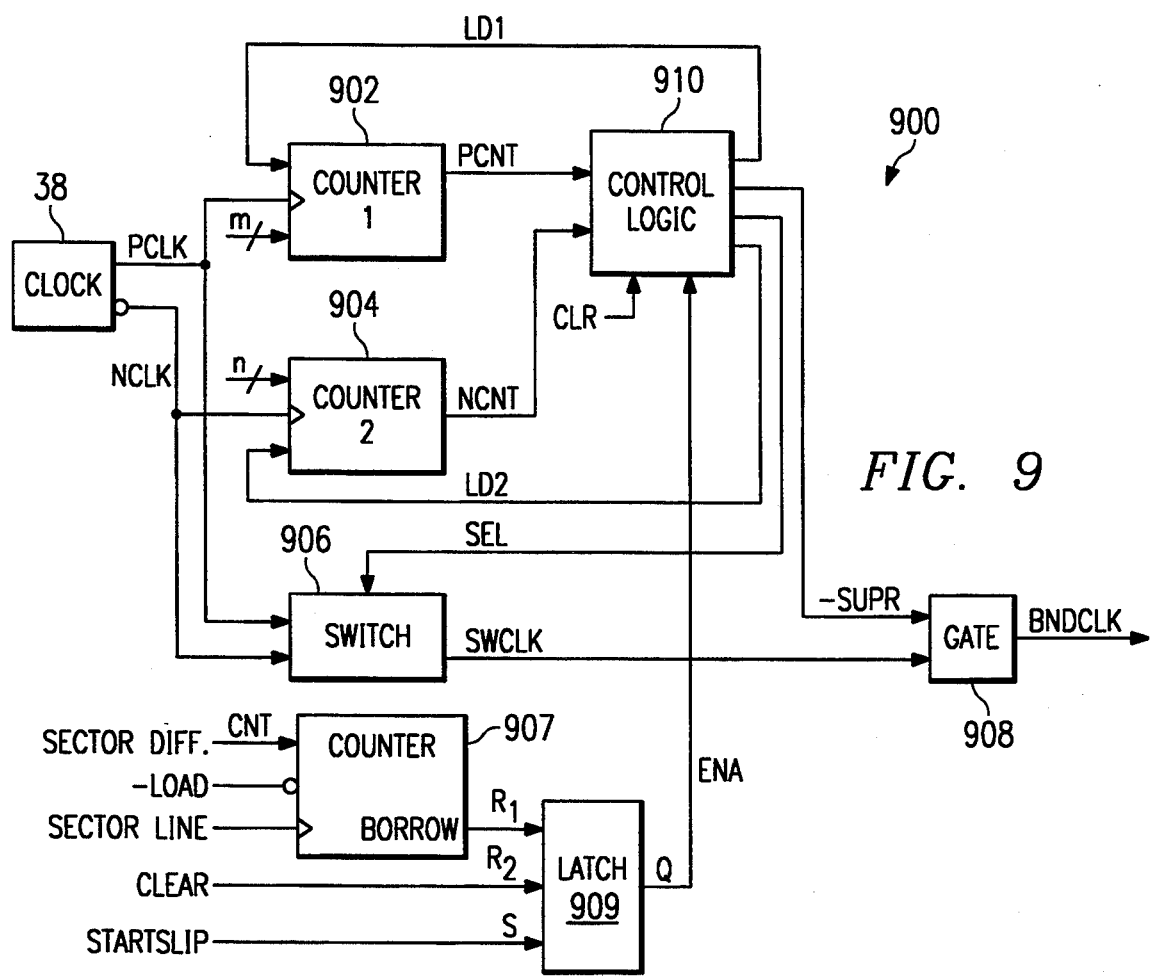
FIG. 9 is a block diagram of another embodiment of the present invention.

FIG. 9 is the block diagram of another embodiment of the clock slipper of the present invention, indicated generally by reference numeral 900. This embodiment uses "half-cycle slipping" to synthesize a signal having a frequency of $f_{N-1}$ from a clock signal with a frequency of $f_N$. The synthesizer 900 includes two clock counters 902 and 904, a switch 906, such as a multiplexer, a gate 908, such as an AND gate, control logic 910, sector counter 907 and the slip enable latch 909.

The clock 38 used in this embodiment outputs two complementary signals, PCLK and NCLK, both at a frequency of $f_N$. An input of the first counter 902 is coupled to receive the signal PCLK; an input of the second counter 904 is coupled to receive the signal NCLK. An output PCNT of the first counter 902 is interconnected with an input of the control logic 910; an output NCNT of the second counter 904 is interconnected with another input of the control logic 910. Counters 902 and 904 each have an input to permit a predetermined number m and n, respectively, to be loaded. As in the embodiment described in connection with FIGS. 6-8, the counters 902 and 904 can be count-up or count-down counters and the signals PCNT and NCNT will indicate the passage of m or n cycles of the clock signal PCLK or NCLK, respectively. Also, as illustrated in FIGS. 6-8, the sector counter 907 and the slip enable latch 909 are loaded with the distance, in sectors, to the band boundary to allow the signal ENA to disable clock slipping at the end of the last sector in band N-1.

Outputs LD1 and LD2 of the control logic 910 are interconnected with inputs of the counters 902 and 904, respectively, to activate the load process of each. The control logic 906 also has clear and enable inputs CLR and ENA, respectively, and another output SEL interconnected with a third input of the switch 906. An input of the gate 908 is coupled to receive the output signal SWCLK from the switch 906; a second input of the gate 908 is interconnected with a fourth output of the control logic 910. An output BNDCLK of the gate 908 carries either the pure clock signal PCLK or NCLK at the frequency $f_N$ or the synthesized clock signal at the frequency $f_{N-1}$, as selected by the control logic 910, to other sections of the controller 22.

Figure 10:
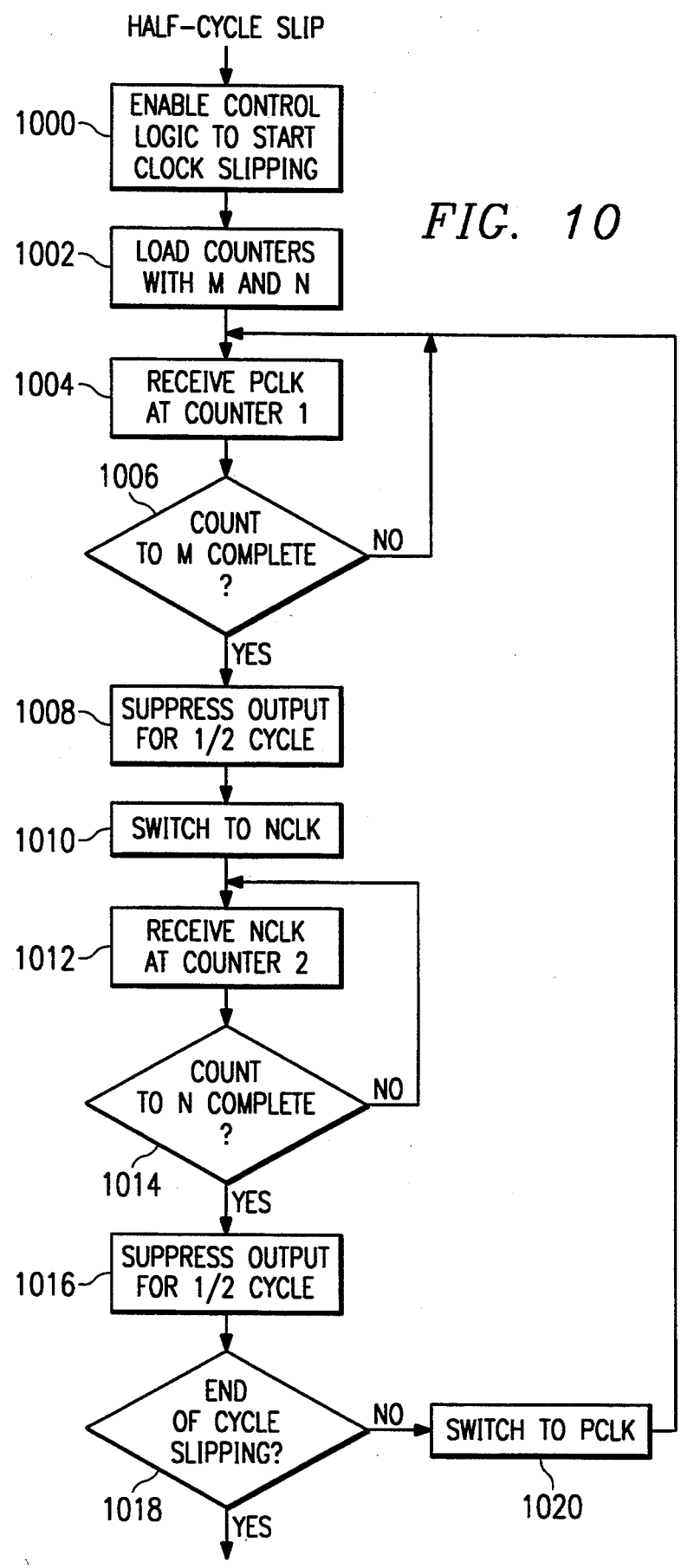
FIG. 10 is a flow chart of the operation of the embodiment illustrated in FIG. 9.

Referring to the flowchart of FIG. 10, a method employed by the embodiment illustrated in FIG. 9 for synthesizing a signal from a clock signal will now be described. When the optical head 28 is positioned such that the laser beam from the head 28 is directed onto a sector in band N-1 and the head 28 begins a tracking operation, the control logic 910 is enabled by the controller 22 (Step 1000) and directs the counters 902 and 904 to load the numbers m and n, respectively, (Step 1002). The first counter 902 begins counting cycles of the clock signal PCLK (Step 1004), up or down as previously discussed.

Simultaneously, the control logic 910, through the signal SEL directs the switch 906 to transmit the signal PCLK to the gate 908. Additionally, the control logic 910, through the signal -SUPR, also directs the gate 908 to transmit the signal SWCLK (which, because there is no suppression, is PCLK) as its output BNDCLK. When the first counter 902 has counted m PCLK cycles (Step 1006), the control logic 910 directs the gate 908 to suppress its output for one-half cycle of PCLK (Step 1008). Additionally, the control logic 910 directs the switch 906 to transmit the NCLK signal as SWCLK to the gate 908. The gate 908 is then directed to resume outputting the signal BNDCLK which now comprises the signal NCLK.

Next, the second counter 904 begins counting cycles of the clock signal NCLK (Step 1012). When the second counter 904 has counted n NCLK cycles (Step 1014), the control logic 910 directs the gate 908 to again suppress its output for one-half cycle of NCLK (Step 1016). Additionally, the control logic 910 directs the switch 906 to transmit the PCLK signal as SWCLK to the gate 908. The gate 908 is then directed to resume outputting the signal BNDCLK which now comprises the signal PCLK (Step 1020).

The resulting output of the gate 908 when the control logic 910 is enabled has average frequency of $f_{N-1}$, the data transfer rate required to read information from sectors in band N-1. The process repeats until the sector counter 907 indicates the end of the last sector in band N-1 and causes the latch 909 to bring down the ENA line (Step 1018). The control logic 910 is then disabled, the switch 906 directed to transmit PCLK (or NCLK) continuously to the gate 908 and the gate 908 outputs as BNDCLK the pure clock signal CLK, at $f_N$, the data transfer rate required to read information from sectors in band N. As in the previously described embodiment, disabling the clock slipping when the end of the last sector in band N-1 has been reached requires only a nominal amount of time; therefore, the controller 22 is ready to read the first sectors in band N without significant delay.

The sum of the m and n cycles counted by the counters 902 and 904 plus the two half-cycles suppressed by the gate 908 equals N; m plus n will equal N-1. Half-cycle slipping with m and n each being approximately ½N provides a system with reduced accumulated phase error and reduced susceptibility to variations in specific chip implementations. For symmetry, m and n can each be ½(N-1) when N is odd. A different rule would have to be applied, however, when N is even; for example: m=½N and n=(½N)-1. Preferably, a single rule should be applied for any N, even or odd, such as: m=integer of (½N) and n=integer of {½(N-1)}. Such a rule can be programmed into the controller 22 and the counters 902 and 904 loaded with appropriately calculated m and n.

Figure 11:
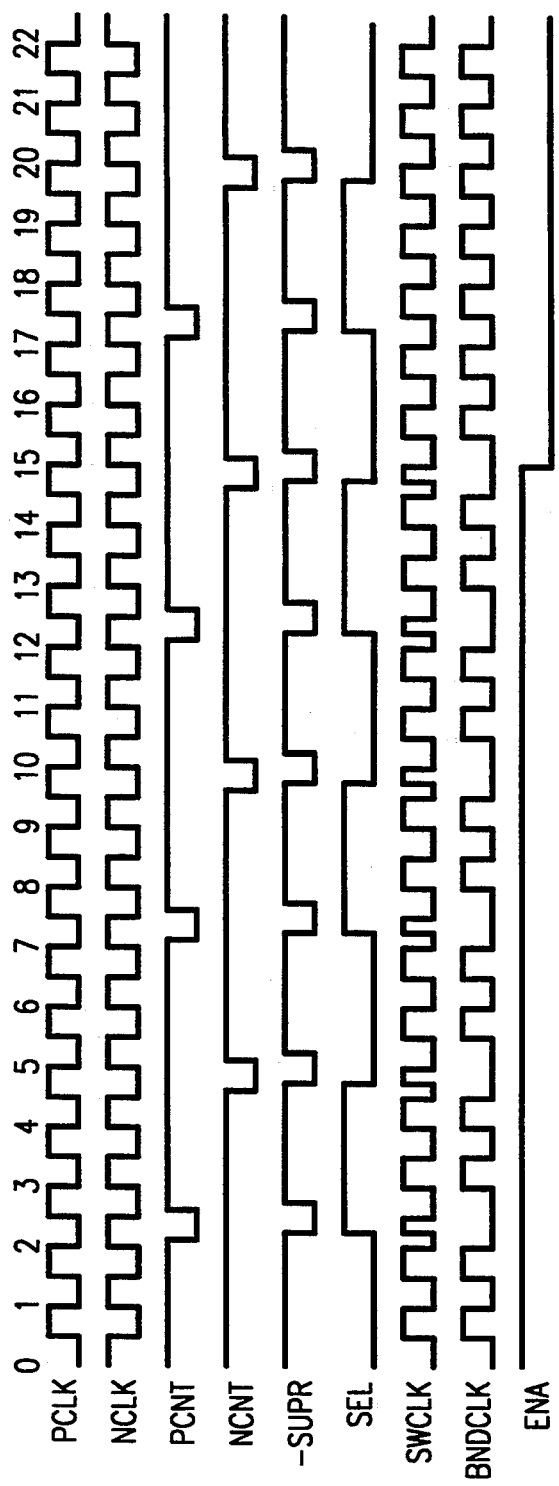
FIG. 11 is a set of exemplary timing diagrams of certain signals from the embodiment illustrated in FIG. 9.

FIG. 11 is a timing diagram of the synthesis of a signal from a clock signal; the waveforms illustrate exemplary signals generated on various lines of the embodiment of FIG. 9. Again, in this example, the target sector is in band N=5 and the optical head lands in the preceding band N-1=4; for illustrative purposes, the respective data transfer rates are 5f and 4f, rather than 21f and 20f.

At time zero in this illustration, the control logic 910 has been enabled by a high ENA signal and the counters 902 and 904 have been loaded with the predetermined numbers, m=2 and n=2, respectively. The outputs PCNT and NCNT of the counters 902 and 904 and the output -SUPR of the control logic 910 are all high. The SEL signal from the control logic 910 is low causing the switch 906 to transmit the PCLK signal to the gate 908.

Therefore, the gate 908 outputs the PCLK signal as signal BNDCLK.

The first counter 902 begins its count to m. Following the completion of the first m=2 of N=5 PCLK cycles, the output PCNT goes low for one cycle causing the state of -SUPR to go low for one cycle and the state of SEL to toggle high. Approximately halfway through the third PCLK cycle, the switch 906 begins transmitting NCLK as its output SWCLK to the gate 908. However, the state of -SUPR causes the gate 908 to suppress its output for one-half of one SWCLK cycle to remove a PCLK "glitch" from SWCLK.

While SEL is high, beginning approximately one-half of a cycle into the third NCLK cycle, the gate 908 transmits NCLK as its output, BNDCLK. Further, the second counter 904 begins its count to n. Following the completion of n=2 NCLK cycles (cycles three and four), the output NCNT goes low for one cycle causing the state of -SUPR to again go low for one cycle and the state of SEL to toggle low. Approximately halfway through the next NCLK cycle (cycle five), the switch 906 begins transmitting PCLK as its output SWCLK to the gate 908. However, the state of -SUPR causes the gate 908 to suppress its output for one-half of one SWCLK cycle to remove the NCLK glitch from SWCLK.

The process repeats until, after the counter has counted the appropriate number of sectors, the head is positioned opposite the end of the last sector in band 4 (N-1), after the fifteenth PCLK cycle illustrated. The control logic 606 directing the cycle slipping is disabled in response to ENA going low and -SUPR remains in the high state. Thus, the BNDCLK transmitted by the gate 604 is the pure PCLK signal, without slipping or suppression, at the frequency of 5f. Over the fifteen PCLK/NCLK cycles, the average frequency of BNDCLK is 4/5 the frequency of PCLK/NCLK.

The present invention thus permits the sectors near a band boundary, including the first sector in a band, to be accessed reliably, despite the possible presence of ID or sector mark defects.

While the invention has been particularly shown and described with reference to preferred embodiments thereof, it will be understood by those skilled in the art that various changes in form and details may be made therein without departing from the spirit and scope of the invention.

What is claimed is:

1. An optical drive controller for positioning an optical head to access a target sector on an optical disk having a banded format, the optical drive controller comprising:

a clock for generating a first clock signal and an inverted clock signal, each having a frequency $f_N$ being a function of a band number N in which a target sector is located on an optical disk, the first clock signal and the inverted clock signal being 180° out of phase with each other;

a first counter interconnected with said clock for generating a first count signal after said first counter has counted a first predetermined number of cycles of the first clock signal;

a second counter interconnected with said clock for generating a second count signal after said second counter has counted a second predetermined number of cycles of the inverted clock signal, the sum of the first and second predetermined number of cycles being equal to N-1, representative of a band immediately preceding the band N on the optical disk;

switch means, coupled to receive the first clock signal and the inverted clock signal, for selecting between the first clock signal and the inverted clock signal;

logic means, coupled to receive the first and second count signals and an enable signal, the enable signal having an enable state and a disable state, said logic means for generating a suppress signal and a select signal when the enable signal is in the enable state and the first count signal or the second count signal is received, said switch means being responsive to the select signal;

suppression means, coupled to receive the suppress signal and the selected first or inverted clock signals, for suppressing a selected one of the first clock signals or the inverted clock signals when the suppress signal is received and for transmitting a selected one of the first clock signals or the inverted clock signals when the suppress signal is not received;

wherein, when said suppression means is enabled by the suppress signal, two one-half cycles are suppressed out of every N cycles of the selected one of the first clock signal or the inverted clock signal and said suppression means has an output with an average frequency of $f_{N-1}$.

2. The controller of claim 1, wherein:

the first predetermined number of cycles is equal to the integer of ($\frac{1}{2}$N); and the second predetermined number of cycles is equal to the integer of $\{\frac{1}{2}(N-1)\}$.

3. The controller of claim 1, wherein said logic means comprises means for establishing the enable signal in the enable state when the optical head is positioned opposite a sector in band N-1, whereby data in sectors in band N-1 can be accessed at frequency $f_{N-1}$, and for establishing the enable signal in the disable state after the optical head is positioned opposite the end of a last sector in band N-1, whereby data in sectors in band N can be accessed at frequency $f_N$.

4. An optical drive controller for positioning an optical head to access a target sector on an optical disk having a banded format, the optical drive controller comprising:

a clock for generating a clock signal having a frequency $f_N$ being a function of a band number N in which a target sector is located;

slipping means, coupled to receive the clock signal, for generating a slipped clock signal having an average frequency $f_{N-1}$ being a function of a band number N-1, band N-1 immediately preceding band N; and means for enabling said slipping means when the optical head is positioned opposite a sector in band N-1, whereby data in sectors in band N-1 can be accessed at frequency $f_{N-1}$, and for disabling said slipping means after the optical head is positioned opposite the end of a last sector in band N-1, whereby data in sectors in band N can be accessed at frequency $f_N$.

5. The controller of claim 4, wherein said slipping means comprises:

a counter interconnected with said clock for generating a count signal after said counter has counted a predetermined number of cycles of the clock signal;

logic means, coupled to receive the count signal and an enable signal, the enable signal having an enable state and a disable state, said logic means for generating a suppress signal when the enable signal is in the enable state and the count signal is received;

suppression means, coupled to receive the suppress signal and the clock signal, for suppressing the clock signal when the suppress signal is received and for transmitting the clock signal when the suppress signal is not received;

wherein, when said suppression means is enabled by the suppress signal, one cycle is suppressed out of every N cycles of the clock signal and the average frequency of the output of said suppression means is $f_{N-1}$.

6. The controller of claim 5, wherein said suppression means comprises an AND gate.

7. The controller of claim 5, further comprising means for loading the predetermined number of cycles into said counter.

8. The controller of claim 4, wherein said slipping means comprises:

a first counter interconnected with said clock for generating a first count signal after said first counter has counted a first predetermined number of cycles of the clock signal;

a second counter interconnected to receive an inverted clock signal from said clock for generating a second count signal after said second counter has counted a second predetermined number of cycles of the inverted clock signal, the sum of the first and second predetermined number of cycles being equal to N-1;

switch means, coupled to receive the clock signal and the inverted clock signal, for selecting between the clock signal and the inverted clock signal;

logic means, coupled to receive the first and second count signals and an enable signal, the enable signal having an enable state and a disable state, said logic means for generating a suppress signal and a select signal when the enable signal is in the enable state and either the first count signal or the second count signal is received, said switch means being responsive to the select signal;

suppression means, coupled to receive the suppress signal and the selected clock signal or inverted clock signal, for suppressing a selected one of the clock signal or the inverted clock signal when the suppress signal is received and for transmitting a selected one of the clock signal or the inverted clock signal when the suppress signal is not received;

wherein, when said suppression means is enabled by the suppress signal, two one-half cycles are suppressed out of every N cycles of the selected one of the clock signal or the inverted clock signal and said suppression means has an output with an average frequency of $f_{N-1}$.

9. The controller of claim 8, wherein:

the first predetermined number of cycles is equal to the integer of ($\frac{1}{2}$N); and the second predetermined number of cycles is equal to the integer of {$\frac{1}{2}$(N-1)}.

10. The controller of claim 8, further comprising means for loading said first and second predetermined number of cycles into said first and second counters, respectively.

11. The controller of claim 8, wherein said switch means comprises a multiplexer.

12. The controller of claim 8, wherein said suppression means comprises an AND gate.

13. An optical disk drive, comprising:

means for rotating an optical disk having a plurality of sectors grouped into a plurality of bands, each band identified by a number;

an optical head for reading information from the disk;

means for positioning said optical head opposite a target sector to be accessed on the disk;

a controller for receiving signals from said optical head;

a clock for generating a series of cycles of a first clock signal having a selected frequency $f_N$, being a function of a band N in which the target sector is located;

slipping means, interconnected with said controller and said clock, for selectively suppressing one cycle of each N cycles of the first clock signal and generating a series of cycles of a second clock signal having an average frequency $f_{N-1}$, being a function of a band N-1 immediately preceding band N; and means for enabling said slipping means when said optical head is positioned opposite an identified sector in band N-1 whereby said controller operates at the average frequency $f_{N-1}$ to receive the signals from said optical head to permit said optical head to read data from sectors in band N-1, and for disabling said slipping means prior to said optical head being positioned opposite a boundary between bands N-1 and N to permit said optical head to read data from sectors in band N at frequency $f_N$.

14. The controller of claim 13, wherein said slipping means comprises:

a counter interconnected with said clock for generating a count signal after said counter has counted a predetermined number of cycles of the first clock signal;

logic means, coupled to receive the count signal and an enable signal, the enable signal having an enable state and a disable state, said logic means for generating a suppress signal when the enable signal is in the enable state and the count signal is received;

suppression means, coupled to receive the suppress signal and the first clock signal, for suppressing the first clock signal when the suppress signal is received and for transmitting from an output the first clock signal when the suppress signal is not received;

wherein, when said suppression means is enabled by the suppress signal, one cycle is suppressed out of every N cycles of the first clock signal and the average frequency of the output of said suppression means is $f_{N-1}$.

15. The controller of claim 13, wherein said slipping means comprises:

a first counter interconnected with said clock for generating a first count signal after said first counter has counted a first predetermined number of cycles of the first clock signal;

a second counter interconnected with said clock for generating a second count signal after said second counter has counted a second predetermined number of cycles of an inverted clock signal, the sum of the first and second predetermined numbers being equal to N-1;

switch means, coupled to receive the first clock signal and the inverted clock signal, for selecting between the first clock signal and the inverted clock signal;

logic means, coupled to receive the first and second count signals and an enable signal, the enable signal having an enable state and a disable state, said logic means for generating a suppress signal and a select signal when the enable signal is in the enable state and the first count signal or the second count signal is received, said switch means being responsive to the select signal;

suppression means, coupled to receive the suppress signal and the selected first or inverted clock signals, for suppressing a selected one of the first clock signal or the inverted clock signal when the suppress signal is received and for transmitting a selected one of the first clock signal or the inverted clock signal when the suppress signal is not received;

wherein, when said suppression means is enabled by the suppress signal, two one-half cycles are suppressed out of every N cycles of the selected one of the first clock signal or the inverted clock signal and the average frequency of the output of said suppression means is $f_{N-1}$.

16. The controller of claim 15, further comprising means for loading said first and second predetermined numbers of cycles into said first and second counters, respectively.

17. The controller of claim 13, wherein said enabling means comprises:

means for determining the number of sectors between the identified sector in band N-1 and the last sector in band N-1;

a counter for counting the number of sectors as said optical head reads data from the sectors in band N-1; and means for transmitting a signal to said slipping means when the counter has counted the determined number of sectors.

18. A method for reading information from a rotatable recording disk, the disk having a spiral track formatted into annular groups of sectors, each sector having a beginning and an end, the method comprising the machine-executable steps of:

generating a clock signal having a frequency of $f_N$, being a function of a band N in which a target sector to be accessed is located;

generating a slipped signal from the clock signal, the slipped signal having an average frequency of $f_{N-1}$, being a function of a band N-1 immediately preceding band N;

positioning a read head opposite a sector P in band N-1;

transmitting the slipped signal to a processor to process, at the average frequency $f_{N-1}$, identification information read from sectors following sector P in band N-1;

terminating the generation of the slipped signal after identifying the end of the last sector in the band N-1; and transmitting the clock signal to the processor to process, at the frequency $f_N$, information read from sectors in band N.

19. The method of claim 18, wherein said step of generating a slipped signal from the clock signal comprises the machine-executable step of suppressing one cycle of each N clock cycles.

20. The method of claim 19, wherein said step of suppressing comprises the machine-executable steps of:
activating a counter;
generating a signal when the counter reaches a predetermined number; and
suppressing the clock signal for one cycle in response to the generated signal.

21. The method of claim 20, wherein the predetermined number is N.

22. The method of claim 18, wherein said step of generating a slipped signal from the clock signal comprises the machine-executable step of suppressing two half-cycles of each N clock cycles.

23. The method of claim 22, wherein said step of suppressing comprises the machine-executable steps of:
receiving the clock signal in a first counter;
generating a first signal when the first counter reaches a first predetermined number;
suppressing the clock signal for one-half cycle in response to the first generated signal;
receiving an inverted clock signal in a second counter;
generating a second signal when the second counter reaches a second predetermined number; and
suppressing the inverted clock signal for one-half cycle in response to the second generated signal.

24. The method of claim 23, wherein:
the first predetermined number equals the integer of ($\frac{1}{2}$N); and
the second predetermined number equals the integer of {$\frac{1}{2}$(N-1)}.

25. The method of claim 18, wherein the target sector is one of the first three sectors in band N.

* * * * *